(12) United States Patent
Covell et al.

(10) Patent No.: US 8,700,641 B2
(45) Date of Patent: Apr. 15, 2014

(54) DETECTING REPEATING CONTENT IN BROADCAST MEDIA

(75) Inventors: Michele Covell, Palo Alto, CA (US); Shumeet Baluja, Leesburg, VA (US); Michael Fink, Jerusalem (IL)

(73) Assignee: Google Inc., Mountain View, CA (US)

( * ) Notice: Subject to any disclaimer, the term of this patent is extended or adjusted under 35 U.S.C. 154(b) by 69 days.

(21) Appl. No.: 13/195,330

(22) Filed: Aug. 1, 2011

(65) Prior Publication Data

US 2012/0059845 A1 Mar. 8, 2012

Related U.S. Application Data

(63) Continuation of application No. 11/563,665, filed on Nov. 27, 2006, now Pat. No. 7,991,770.

(60) Provisional application No. 60/740,760, filed on Nov. 29, 2005, provisional application No. 60/823,881, filed on Aug. 29, 2006.

(51) Int. Cl.
*G06F 7/00* (2006.01)
*G06F 17/30* (2006.01)

(52) U.S. Cl.
USPC .................... 707/749; 707/722; 707/758

(58) Field of Classification Search
USPC .......... 707/748, 749, 758, 722, 751, 600, 603
See application file for complete search history.

(56) References Cited

U.S. PATENT DOCUMENTS

| | | | |
|---|---|---|---|
| 4,811,399 A | 3/1989 | Landell et al. | |
| 5,706,364 A | 1/1998 | Kopec et al. | |
| 5,870,744 A | 2/1999 | Sprague | |
| 6,023,693 A | 2/2000 | Masuoka et al. | |
| 6,236,758 B1 | 5/2001 | Sodagar et al. | |
| 6,494,720 B1 | 12/2002 | Meyrowitsch | |
| 6,529,526 B1 | 3/2003 | Schneidewend | |
| 6,563,909 B2 | 5/2003 | Schmitz | |
| 6,585,521 B1 | 7/2003 | Obrador | |
| 6,704,920 B2 | 3/2004 | Brill et al. | |
| 6,751,601 B2 | 6/2004 | Zegers | |
| 6,763,339 B2 | 7/2004 | Fu et al. | |
| 6,766,523 B2 | 7/2004 | Herley | |
| 6,773,266 B1 | 8/2004 | Dornbush et al. | |
| 6,782,186 B1 | 8/2004 | Covell et al. | |

(Continued)

FOREIGN PATENT DOCUMENTS

| | | |
|---|---|---|
| EP | 1524857 | 4/2005 |
| JP | 2004049438 | 2/2004 |

OTHER PUBLICATIONS

Author: Koo et al.; Title: Speech Recognition and Utterance Verification Based on a Generalized Confidence Score; Date: 2001; pp. 821-832.*
U.S. Appl. No. 11/468,265, filed Aug. 29, 2006, Covell et al.

(Continued)

*Primary Examiner* — Md I Uddin
(74) *Attorney, Agent, or Firm* — Turocy & Watson, LLP

(57) ABSTRACT

Systems, methods, devices, and computer program products provide social and interactive applications for detecting repeating content in broadcast media. In some implementations, a method includes: generating a database of audio statistics from content; generating a query from the database of audio statistics; running the query against the database of audio statistics to determine a non-identity match; if a non-identity match exists, identifying the content corresponding to the matched query as repeating content.

15 Claims, 7 Drawing Sheets

(56) References Cited

U.S. PATENT DOCUMENTS

| | | |
|---|---|---|
| 6,879,967 B1 | 4/2005 | Stork |
| 6,892,191 B1 | 5/2005 | Schaffer |
| 6,895,514 B1 | 5/2005 | Kermani |
| 6,944,632 B2 | 9/2005 | Stern |
| 6,970,131 B2 | 11/2005 | Percy et al. |
| 7,103,801 B2 | 9/2006 | Marilly et al. |
| 7,107,207 B2 | 9/2006 | Goodman |
| 7,174,293 B2 | 2/2007 | Kenyon et al. |
| 7,266,492 B2 | 9/2007 | Goodman |
| 7,281,219 B2 | 10/2007 | Hamilton et al. |
| 7,375,304 B2 | 5/2008 | Kainec et al. |
| 7,386,479 B2 | 6/2008 | Mizuno |
| 7,472,096 B2 | 12/2008 | Burges et al. |
| 7,617,164 B2 | 11/2009 | Burges et al. |
| 7,831,531 B1 | 11/2010 | Baluja et al. |
| 2002/0133499 A1 | 9/2002 | Ward et al. |
| 2003/0028796 A1* | 2/2003 | Roberts et al. ............... 713/193 |
| 2003/0093790 A1 | 5/2003 | Logan et al. |
| 2003/0101144 A1 | 5/2003 | Moreno |
| 2004/0025174 A1 | 2/2004 | Cerrato et al. |
| 2004/0030688 A1* | 2/2004 | Aridor et al. ..................... 707/3 |
| 2004/0031058 A1 | 2/2004 | Reisman |
| 2004/0128682 A1 | 7/2004 | Liga et al. |
| 2004/0199387 A1 | 10/2004 | Wang et al. |
| 2005/0066352 A1 | 3/2005 | Herley |
| 2005/0086682 A1 | 4/2005 | Burges et al. |
| 2005/0096920 A1 | 5/2005 | Matz et al. |
| 2005/0147256 A1 | 7/2005 | Peters et al. |
| 2005/0193016 A1 | 9/2005 | Seet et al. |
| 2005/0283792 A1 | 12/2005 | Swix et al. |
| 2006/0080356 A1 | 4/2006 | Burges et al. |
| 2006/0174348 A1 | 8/2006 | Rhoads et al. |
| 2007/0124756 A1 | 5/2007 | Covell et al. |
| 2007/0130580 A1 | 6/2007 | Covell et al. |
| 2007/0143778 A1 | 6/2007 | Covell et al. |
| 2008/0090551 A1 | 4/2008 | Gidron et al. |
| 2008/0263041 A1 | 10/2008 | Cheung |

OTHER PUBLICATIONS

"Community" definition. Oxford English Dictionary. Accessed Apr. 27, 2009. http://dictionary.oed.com/cgi/entry/50045241?single=1&query_type=word&queryword=community, 17 pages.

"Compression" definition. Oxford English Dictionary. Accessed Apr. 27, 2009. http://dictionary.oed.com/cgi/entry/50045890?single=1&query_type=word&queryword=compression, 4 pages.

"Database" definition. Oxford English Dictionary. Accessed Apr. 27, 2009. http://dictionary.oed.com/cgi/entry/50057772?single=1&query_type=word&queryword=database, 2 pages.

"Encrypt" definition. Oxford English Dictionary. Accessed Apr. 27, 2009. http://dictionary.oed.com/cgi/entry/00292459?single=1&query_type=word&queryword=encrypt, 1 page.

"Shazam Experience Music" [online]. [retrieved on May 30, 2007]. Retrieved from the Internet: <URL: www.shazam.com/music/portal/sp/s/media-type/html/user/anon/page/default/template/Myhome/music.html>, 2 pages.

Burges et al., "Duplicate Detection and Audio Thumbnails with Audio Fingerprinting" [online]. 2004, [retrieved on Nov. 21, 2006]. <URL: www.research.microsoft.com/~cburges/tech_reports/tr-2004-19.pdf>, 5 pages.

Burges et al., "Using Audio Fingerprinting for Duplicate Detection and Thumbnail Generation," Mar. 2005, 4 pages.

Cano et al., "A Review of Algorithms for Audio Fingerprinting" [online]. 2002, [retrieved on Nov. 21, 2006]. Retrieved from the Internet: <URL: www.iua.upf.es/mtg/publications/MMSP-2002-pcano.pdf>, 5 pages.

Cohen et al., "Finding Interesting Associations without Support Pruning," 2001, Retrieved from the Internet: <URL: www.dbis.informatik.huberlin.de/dbisold/lehre/WS0405/kDD/paper/CDFG_00.pdf>, 12 pages.

Ding, et al. "Robust Technologies towards Automatic Speech Recognition in Car Noise Environments," *Signal Processing, 2006 8th International Conference*, 2006, vol. 1, 3 pages.

Gauch et al., "Identification of New Commercials Using Repeated Video Sequence Detection," *Image Processing, 2005, ICIP 2005, IEEE International Conference*, 2005, pp. 1252-1255.

Gorin et al., "On adaptive acquisition of language," *Acoustics, Speech, and Signal Processing*, 1990, 1:601-604.

Haitsma et al, "A Highly Robust Audio Fingerprinting System" [online]. 2002,[retrieved on Nov. 16, 2006]. Retrieved from the Internet: <URL: www.ismir2002.ismir.net/proceedings/02-FP04-2.pdf>, 9 pages.

Jacobs et al., "Fast Multiresolution Image Querying" [online]. 1995, [retrieved on Nov. 21, 2006]. Retrieved from the Internet: <URL: www.grail.cs.washington.edu/projects/query/mrquery.pdf>, 10 pages.

Jeong et al., "An information theoretic approach to adaptive system training using unlabeled data," *Proceedings of International Joint Conference on Neural Networks*, 2005, 1:191-195.

Kang et al., "A Multi-layer Adaptive Function Neural Network (MADFUNN) for Analytical Function Recognition," *International Joint Conference on Neural Networks*, 2006, pp. 1784-1789.

Kang et al., "An adaptive function neural network ADFUNN) for phrase recognition," *Proceedings 2005 IEEE International Joint Conference on Neural Networks*, 2005, 1:593-597.

Ke et al., "Computer Vision for Music Identification" [online]. 2005, [retrieved on Nov. 21, 2006]. Retrieved from the Internet: <URL: www.cs.cmu.edu/~yke/musicretrieval/cvpr2005-mr.pdf>, 8 pages.

Lin et al., "Input Data Representation for Self-Organizing Map in Software Classification," *2009 Second International Symposium on Knowledge Acquisition and Modeling*, 2009,2:350-353.

Miyazawa, "An all-phoneme ergodic HMM for unsupervised speaker adaptation," *IEEE International Conference on Acoustics, Speech, and Signal Processing*, 1993, 2:574-577.

Sadlier et al., "Automatic TV Advertisement Detection from MPEG Bitstream," *Pattern Recognition*, 2001, 35(12):2719-2726.

Shazam, "Shazam Entertainment Brings Music Recognition to Windows Mobile 5.0 Powered Smartphones" [online]. 2006, [retrieved on Nov. 16, 2006]. Retrieved from the Internet: <URL: www..shazam.com/music/portal/sp/s/media-type/html/user/anon/page/default/template/pages/p/company_release30.html>, 1 page.

Stanford, "C5276 Information Retrieval and Web Mining" [online]. 2005, [retrieved on Nov. 16, 2006]. Retrieved from the Internet: <URL: www.stanford.edu/class/cs276/handouts/lecture19.pdf>, 8 pages.

Stanford, "Data Mining: Associations" [online]. 2002, [retrieved on Nov. 16, 2006]. Retrieved from the Internet: <URL: www.stanford.edu/class/cs206/cs206-2.pdf>, 11 pages.

Stollnitz et al., "Wavelets for Computer Graphics: A Primer, Part 1," *IEEE Computer Graphics and Applications*, 1995, 15(3), 8 pages.

Stollnitz et al., "Wavelets for Computer Graphics: Applications, A Primer, Part 2," *IEEE Computer Graphics and Applications*, 1995, 15(4), 9 pages.

Viola et al., "Robust Real-Time Object Detection," Int. J. Computer Vision, 2002, 25 pages.

Wang et al., "Training neural networks with additive noise in the desired signal," *IEE Transactions on Neural Networks*, 1999, 10(6):1511-1517.

Wang et al., "Training neural networks with additive noise in the desired signal," *Neurla Networks Proceedings, 1998. IEEE World Congress on Computational Intelligence*, 1998, 2:1084-1089.

Wang, "The Shazam Music Recognition Service," *Communications of the ACM*, 2006, 49(8):44-48.

Weixin et al. "Learning to Rank Using Semantic Features in Document Retrieval," *Global Congress on Intelligent Systems*, 2009, 3:500-504.

Yang, "MACS: Music Audio Characteristic Sequence Indexing for Similarity Retrieval," Oct. 21-24, 2001, New Paltz, New York. pp. 123-126.

Zhao, "Connectionist training of non-linear hidden Markov models for speech recognition," *Neural Networks, 1991 IEEE International Joint Conference*, 1991, 2:1647-1652.

Authorized Officerc. Gabriel. Supplemental EP Search Report for EP Application No. 06838486.6 dated Feb. 16, 2010, 8 pages.

Authorized Officerc. Gabriel. Supplemental EP Search Report for EP Application No. 06838488.2 dated Feb. 16, 2010, 8 pages.

(56) References Cited

OTHER PUBLICATIONS

Authorized Officer B. Copenheaver. PCT International Search Report for PCT/US2006/045549 dated Oct. 9, 2007, 10 pages.
Authorized Officer S. Beliveau. PCT International Search Report for PCT/US2006/045551 dated Jul. 21, 2008, 20 pages.
International Preliminary Report on Patentability, Application No. PCT/US06/45549 mailed Jun. 12, 2008, 7 pages.
Authorized Officerc. Gabriel, European Search Report, EP Application No. 08 15 3719 mailed Sep. 26, 2008, 8 pages.
International Preliminary Report on Patentability, Application No. PCT/US06/45551 mailed Apr. 2, 2009, 11 pages.
Chinese Patent Office Action for Application No. 200680051559.0 dated Jan. 22, 2010, 14 pages.
Notice of Reasons for Rejection for Japanese Patent Application No. 2008-543391, mailed Dec. 13, 2011, 3 pages.

* cited by examiner

DETECTING REPEATING CONTENT IN BROADCAST MEDIA

RELATED APPLICATIONS

This application claims the benefit of priority from U.S. Provisional Patent Application No. 60/740,760, for "Environment-Based Referrals," filed Nov. 29, 2005, which application is incorporated by reference herein its entirety.

This application claims the benefit of priority from U.S. Provisional Patent Application No. 60/823,881, for "Audio Identification Based on Signatures," filed Aug. 29, 2006, which application is incorporated by reference herein its entirety.

This application is related to U.S. patent application Ser. No. 11/563,653, for "Determining Popularity Ratings Using Social and Interactive Applications For Mass Media," filed Nov. 27, 2006, and U.S. patent application Ser. No. 11/563,661, for "Social and Interactive Applications For Mass Media," filed Nov. 27, 2006. Each of these patent applications is incorporated by reference herein in its entirety.

TECHNICAL FIELD

The disclosed implementations are related to social and interactive applications for mass media.

BACKGROUND

Conventional television and interactive television systems lack the ability to detect rebroadcasts of advertising embedded in television programming. Conventional recording devices allow users to store television programs (including commercials) for rebroadcast at a later date or time. A common complaint among broadcasters is their inability to profit from these rebroadcasts, which from the broadcasters' perspective amounts to "free" advertising for the advertisers who bought space on the show's original airing.

SUMMARY

The deficiencies described above are addressed by the disclosed systems, methods, apparatuses, user interfaces and computer program products detecting repeating content in broadcast media.

In some implementations, a method includes: generating a query from a database of audio statistics; running the query against the database of audio statistics to determine a non-identity match; and if a non-identity match exists, identifying the content corresponding to the matched query as repeating content.

In some implementations, a system includes a processor and a computer-readable medium operatively coupled to the processor. The computer-readable medium includes instructions, which, when executed by the processor, causes the processor to perform the operations of: generating a query from a database of audio statistics; running a query against the database of audio statistics to determine a non-identity match, where the audio statistics are generated from content; and if a non-identity match is found, identifying content corresponding to the matched query as repeating content.

Other implementations are directed to systems, methods, apparatuses, user interfaces, and computer program products.

DETAILED DESCRIPTION

Mass Personalization Applications

Mass personalization applications provide personalized and interactive information related to mass media broadcasts (e.g., television, radio, movies, Internet broadcasts, etc.). Such applications include but are not limited to: personalized information layers, ad hoc social peer communities, real-time popularity ratings and video (or audio) bookmarks, etc. Although some of the mass media examples disclosed herein are in the context of television broadcasts, the disclosed implementations are equally applicable to radio and/or music broadcasts.

Personalized information layers provide complementary information to the mass media channel. Examples of personalized information layers include but are not limited to: fashion, politics, business, health, traveling, etc. For example, while watching a news segment on a celebrity, a fashion layer is presented to the viewer on a television screen or a computer display device, which provides information and/or images related to the clothes and accessories the celebrity is wearing in the news segment. Additionally, personalized layers may include advertisements promoting products or services related to the news segment, such as a link to a clothing store that is selling clothes that the celebrity is wearing.

Ad hoc social peer communities provide a venue for commentary between users who are watching the same show on television or listening to the same radio station. For example, a user who is watching the latest CNN headlines can be provided with a commenting medium (e.g., a chat room, message board, wiki page, video link, etc.) that allows the user to chat, comment on or read other viewers responses to the ongoing mass media broadcast.

Real-time popularity ratings provide content providers and users with ratings information (similar to Nielsen ratings). For example, a user can instantaneously be provided with real-time popularity ratings of television channels or radio stations being watched or listened to by the user's social network and/or by people with similar demographics.

Video or audio bookmarks provide users with low effort ways of creating personalized libraries of their favorite broadcast content. For example, a user can simply press a button on a computer or a remote control device and a snippet of ambient audio and/or video of the broadcast content is recorded, processed and saved. The snippet can be used as a bookmark to refer to the program, or portions of the program, for later viewing. The bookmark can be shared with friends or saved for future personal reference.

Mass Personalization Network

Figure 1:
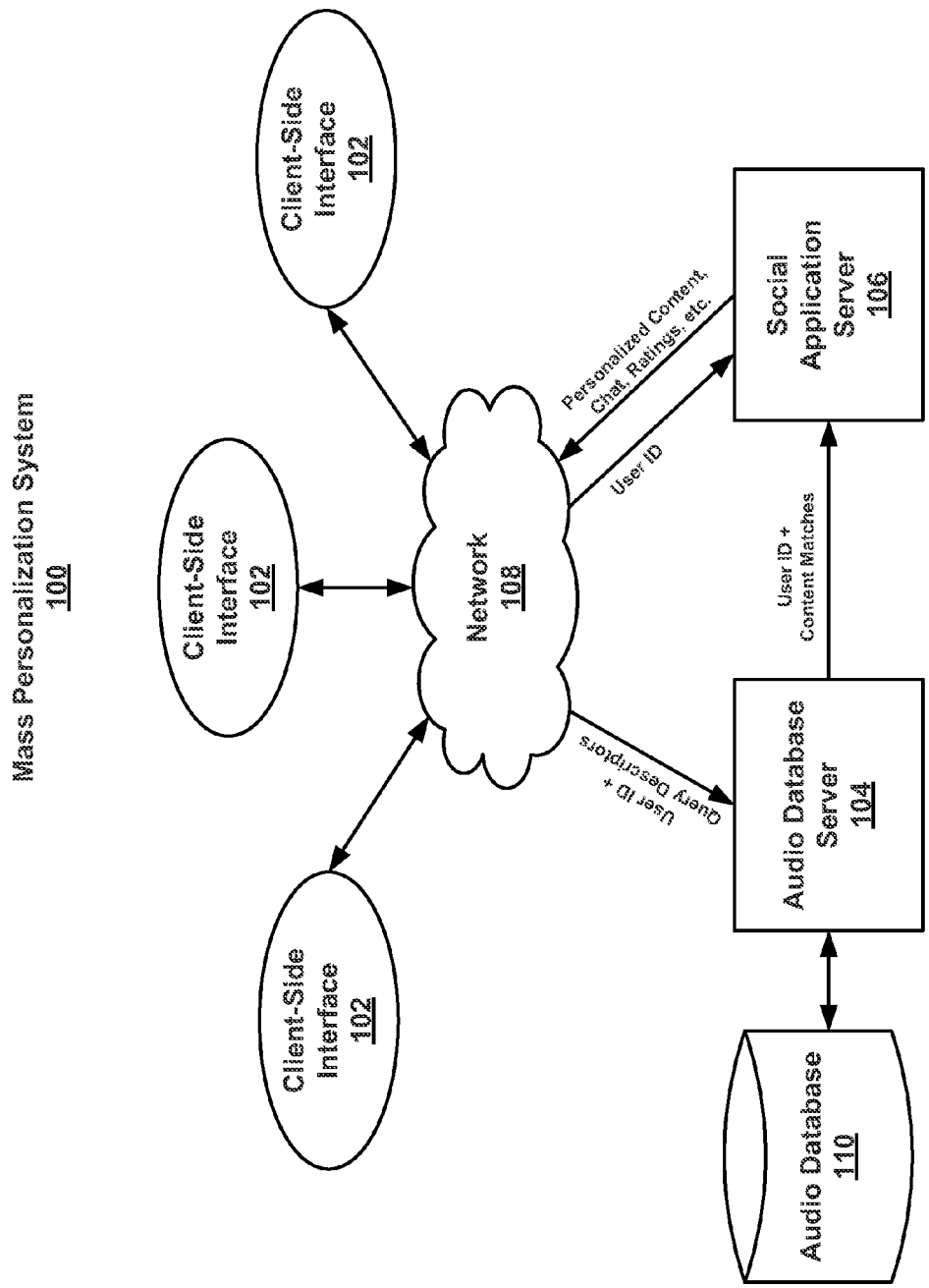
FIG. 1 is a block diagram of one embodiment of a mass personalization system.

FIG. 1 is a block diagram of a mass personalization system 100 for providing mass personalization applications. The system 100 includes one or more client-side interfaces 102, an audio database server 104 and a social application server 106, all of which communicate over a network 108 (e.g., the Internet, an intranet, LAN, wireless network, etc.).

A client interface 102 can be any device that allows a user to enter and receive information, and which is capable of presenting a user interface on a display device, including but not limited to: a desktop or portable computer; an electronic device; a telephone; a mobile phone; a display system; a television; a computer monitor; a navigation system; a portable media player/recorder; a personal digital assistant (PDA); a game console; a handheld electronic device; and an embedded electronic device or appliance. The client interface 102 is described more fully with respect to FIG. 2.

In some implementations, the client-interface 102 includes an ambient audio detector (e.g., a microphone) for monitoring and recording the ambient audio of a mass media broadcast in a broadcast environment (e.g., a user's living room). One or more ambient audio segments or "snippets" are converted into distinctive and robust statistical summaries, referred to as "audio fingerprints" or "descriptors." In some implementations, the descriptors are compressed files containing one or more audio signature components that can be compared with a database of previously generated reference descriptors or statistics associated with the mass media broadcast.

A technique for generating audio fingerprints for music identification is described in Ke, Y., Hoiem, D., Sukthankar, R. (2005), Computer Vision for Music Identification, *In Proc. Computer Vision and Pattern Recognition*, which is incorporated herein by reference in its entirety. In some implementations, the music identification approach proposed by (hereinafter "Ke et al.") is adapted to generate descriptors for television audio data and queries, as described with respect to FIG. 4.

A technique for generating audio descriptors using wavelets is described in U.S. Provisional Patent Application No. 60/823,881, for "Audio Identification Based on Signatures." That application describes a technique that uses a combination of computer-vision techniques and large-scale-data-stream processing algorithms to create compact descriptors/fingerprints of audio snippets that can be efficiently matched. The technique uses wavelets, which is a known mathematical tool for hierarchically decomposing functions.

In "Audio Identification Based on Signatures," an implementation of a retrieval process includes the following steps: 1) given the audio spectra of an audio snippet, extract spectral images of, for example, 11.6*w ms duration, with random spacing averaging d-ms apart. For each spectral image: 2) compute wavelets on the spectral image; 3) extract the top-t wavelets; 4) create a binary representation of the top-t wavelets; 5) use min-hash to create a sub-fingerprint of the top-t wavelets; 6) use LSH with b bins and 1 hash tables to find sub-fingerprint segments that are close matches; 7) discard sub-fingerprints with less than v matches; 8) compute a Hamming distance from the remaining candidate sub-fingerprints to the query sub-fingerprint; and 9) use dynamic programming to combined the matches across time.

In some implementations, the descriptors and an associated user identifier ("user id") for identifying the client-side interface 102 are sent to the audio database server 104 via network 108. The audio database server 104 compares the descriptor to a plurality of reference descriptors, which were previously determined and stored in an audio database 110 coupled to the audio database server 104. In some implementations, the audio database server 104 continuously updates the reference descriptors stored in the audio database 110 from recent mass media broadcasts.

The audio database server 104 determines the best matches between the received descriptors and the reference descriptors and sends best-match information to the social application server 106. The matching process is described more fully with respect to FIG. 4.

In some implementations, the social application server 106 accepts web-browser connections associated with the client-side interface 102. Using the best-match information, the social application server 106 aggregates personalized information for the user and sends the personalized information to the client-side interface 102. The personalized information can include but is not limited to: advertisements, personalized information layers, popularity ratings, and information associated with a commenting medium (e.g., ad hoc social peer communities, forums, discussion groups, video conferences, etc.).

In some implementations, the personalized information can be used to create a chat room for viewers without knowing the show that the viewers are watching in real time. The chat rooms can be created by directly comparing descriptors in the data streams transmitted by client systems to determine matches. That is, chat rooms can be created around viewers having matching descriptors. In such an implementation, there is no need to compare the descriptors received from viewers against reference descriptors.

In some implementations, the social application server 106 serves a web page to the client-side interface 102, which is received and displayed by a web browser (e.g., Microsoft Internet Explorer™) running at the client-side interface 102. The social application server 106 also receives the user id from the client-side interface 102 and/or audio database server 104 to assist in aggregating personalized content and serving web pages to the client-side interface 102.

It should be apparent that other implementations of the system 100 are possible. For example, the system 100 can include multiple audio databases 110, audio database servers 104 and/or social application servers 106. Alternatively, the audio database server 104 and the social application server 106 can be a single server or system, or part of a network resource and/or service. Also, the network 108 can include multiple networks and links operatively coupled together in various topologies and arrangements using a variety of network devices (e.g., hubs, routers, etc.) and mediums (e.g., copper, optical fiber, radio frequencies, etc.). Client-server architectures are described herein only as an example. Other computer architectures are possible.

Ambient Audio Identification System

Figure 2:
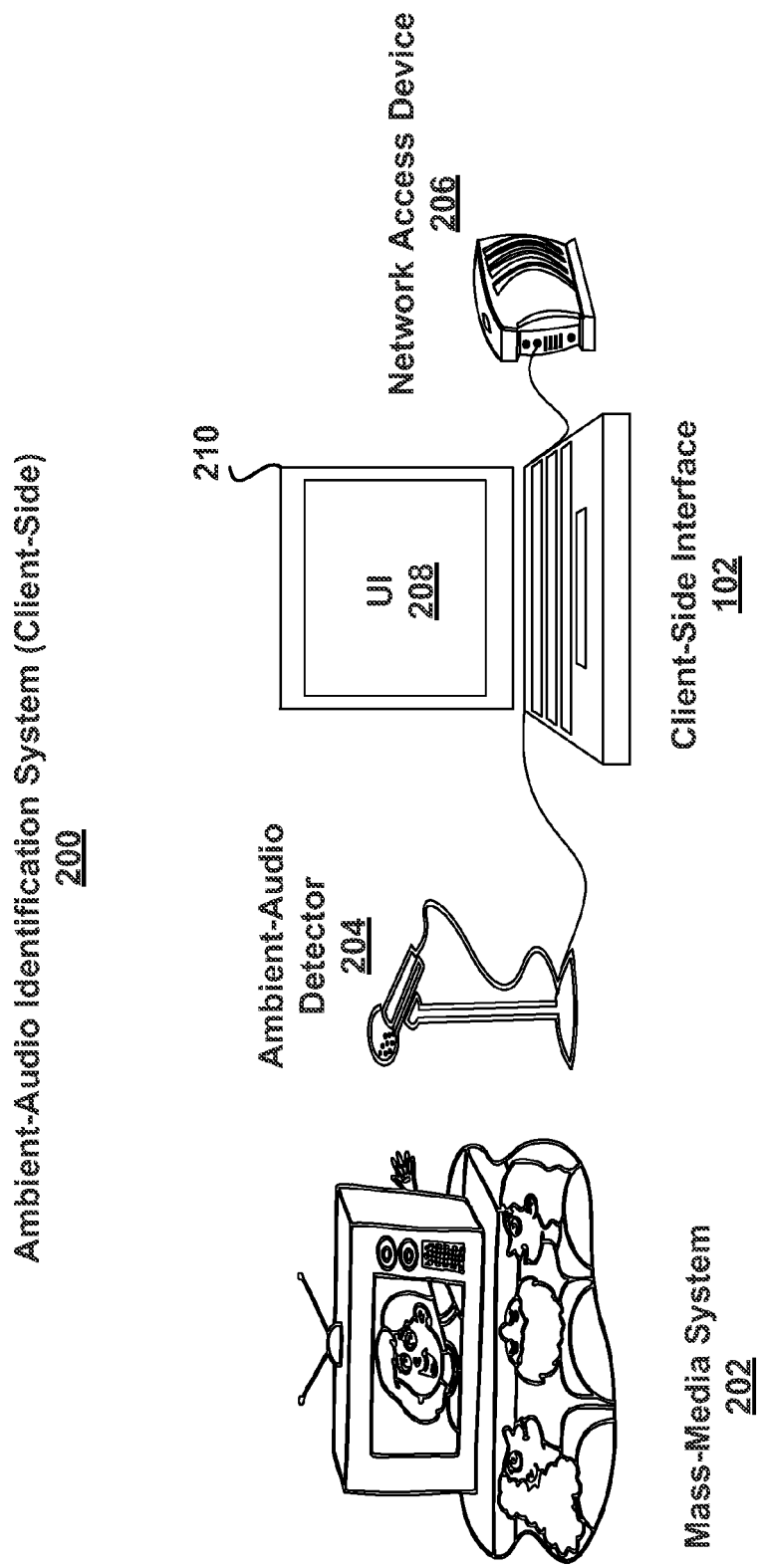
FIG. 2 illustrates one embodiment of an ambient-audio identification system, including the client-side interface shown in FIG. 1.

FIG. 2 illustrates an ambient audio identification system 200, including a client-side interface 102 as shown in FIG. 1. The system 200 includes a mass media system 202 (e.g., a television set, radio, computer, electronic device, mobile phone, game console, network appliance, etc.), an ambient audio detector 204, a client-side interface 102 (e.g., a desktop or laptop computer, etc.) and a network access device 206. In some implementations, the client-side interface 102 includes a display device 210 for presenting a user interface (UI) 208 for enabling a user to interact with a mass personalization application, as described with respect to FIG. 5.

In operation, the mass media system 202 generates ambient audio of a mass media broadcast (e.g., television audio), which is detected by the ambient audio detector 204. The ambient audio detector 204 can be any device that can detect ambient audio, including a freestanding microphone and a microphone that is integrated with the client-side interface 102. The detected ambient audio is encoded by the client-side interface 102 to provide descriptors identifying the ambient audio. The descriptors are transmitted to the audio database server 104 by way of the network access device 206 and the network 108.

In some implementations, client software running at the client-side interface 102 continually monitors and records n-second (e.g., 5 second) audio files ("snippets") of ambient audio. The snippets are then converted into m-frames (e.g., 415 frames) of k-bit encoded descriptors (e.g., 32-bit), according to a process described with respect to FIG. 4. In some implementations, the monitoring and recording is event based. For example, the monitoring and recording can be automatically initiated on a specified date and at a specified time (e.g., Monday, 8:00 P.M.) and for a specified time duration (e.g., between 8:00-9:00 P.M.). Alternatively, the monitoring and recording can be initiated in response to user input (e.g., a mouse click, function key or key combination) from a control device (e.g., a remote control, etc.). In some implementations, the ambient audio is encoded using a streaming variation of the 32-bit/frame discriminative features described in Ke et al.

In some implementations, the client software runs as a "side bar" or other user interface element. That way, when the client-side interface 102 is booted up, the ambient audio sampling can start immediately and run in the "background" with results (optionally) being displayed in the side bar without invoking a full web-browser session.

In some implementations, the ambient audio sampling can begin when the client-side interface 102 is booted or when the viewer logs into a service or application (e.g., email, etc.)

The descriptors are sent to the audio database server 104. In some implementations, the descriptors are compressed statistical summaries of the ambient audio, a described in Ke et al. By sending statistical summaries, the user's acoustic privacy is maintained because the statistical summaries are not reversible, i.e., the original audio cannot be recovered from the descriptor. Thus, any conversations by the user or other individuals monitored and recorded in the broadcast environment cannot be reproduced from the descriptor. In some implementations, the descriptors can be encrypted for extra privacy and security using one or more known encryption techniques (e.g., asymmetric or symmetric key encryption, elliptic encryption, etc.).

In some implementations, the descriptors are sent to the audio database server 104 as a query submission (also referred to as a query descriptor) in response to a trigger event detected by the monitoring process at the client-side interface 102. For example, a trigger event could be the opening theme of a television program (e.g., opening tune of "Seinfeld") or dialogue spoken by the actors. In some implementations, the query descriptors can be sent to the audio database server 104 as part of a continuous streaming process. In some implementations, the query descriptors can be transmitted to the audio database server 104 in response to user input (e.g., via remote control, mouse clicks, etc.).

Mass Personalization Process

Figure 3:
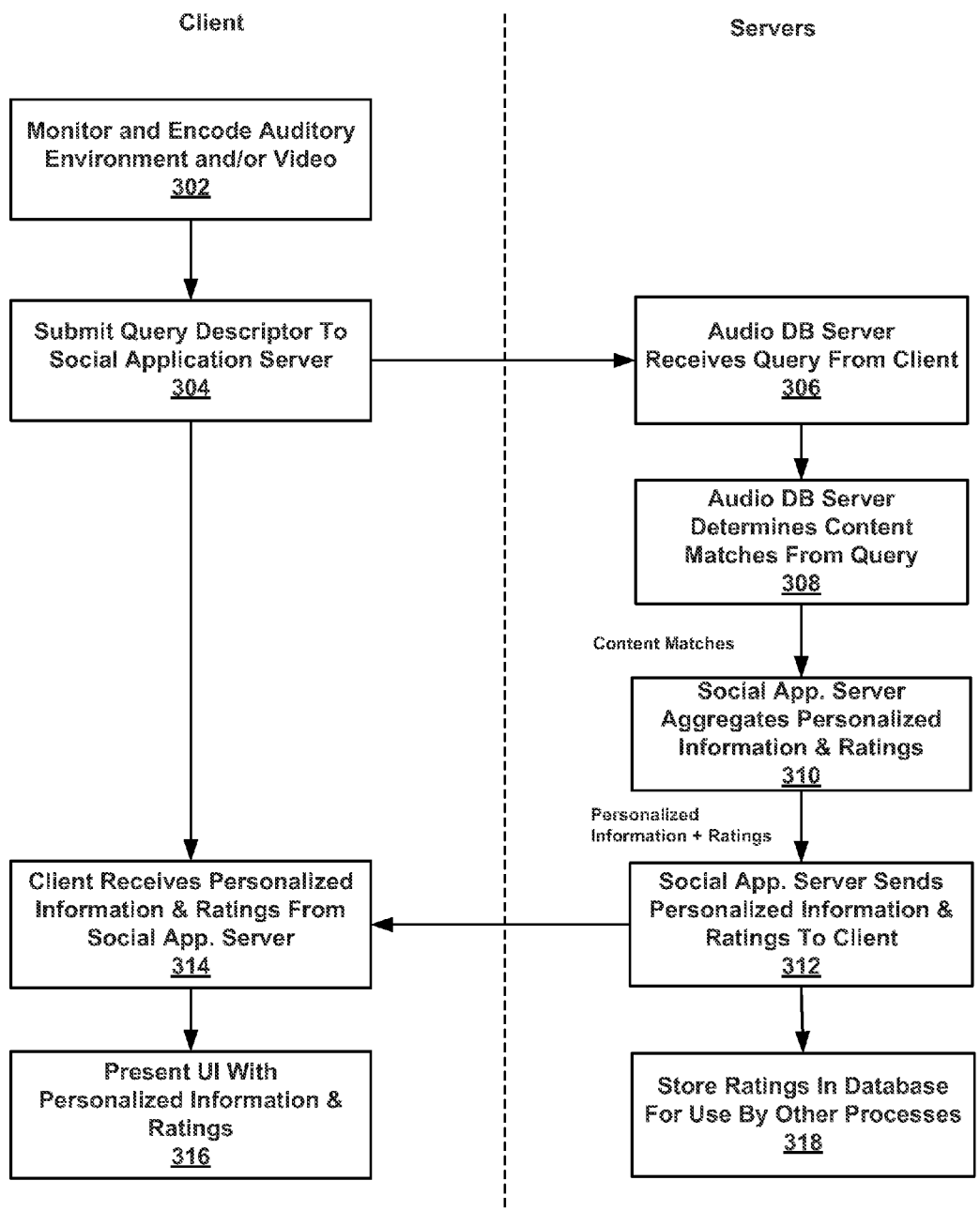
FIG. 3 is a flow diagram of one embodiment of a process for providing mass-personalization applications.

FIG. 3 is a flow diagram a mass personalization process 300. The steps of process 300 do not have to be completed in any particular order and at least some steps can be performed at the same time in a multi-threading or parallel processing environment.

The process 300 begins when a client-side interface (e.g., client-side interface 102) monitors and records snippets of ambient audio of a mass media broadcast in a broadcast environment (302). The recorded ambient audio snippets are encoded into descriptors (e.g., compressed statistical summaries), which can be sent to an audio database server (304) as queries. The audio database server compares the queries against a database of reference descriptors computed from mass media broadcast statistics to determine candidate descriptors that best match the query (308). The candidate descriptors are sent to a social application server or other network resource, which uses the candidate descriptors to aggregate personalized information for the user (310). For example, if the user is watching the television show "Seinfeld," then query descriptors generated from the show's ambient audio will be matched with reference descriptors derived from previous "Seinfeld" broadcasts. Thus, the best matching candidate descriptors are used to aggregate personalized information relating to "Seinfeld" (e.g., news stories, discussion groups, links to ad hoc social peer communities or chat rooms, advertisements, etc.). In some implementations, the matching procedure is efficiently performed using hashing techniques (e.g., direct hashing or locality sensitive hashing (LSH)) to achieve a short list of candidate descriptors, as described with respect to FIG. 4. The candidate descriptors are then processed in a validation procedure, such as described in Ke et al.

In some implementations, query descriptors from different viewers are directly matched rather than matching each query with a database of reference descriptors. Such an embodiment would enable the creation of ad hoc social peer communities on subject matter for which a database of reference descriptors is not available. Such an embodiment could match in real-time viewers who are in the same public form (e.g., stadium, bar, etc.) using portable electronic devices (e.g., mobile phones, PDAs, etc.).

Popularity Ratings

In some implementations, real-time and aggregate statistics are inferred from a list of viewers currently watching the broadcast (e.g., show, advertisement, etc.). These statistics can be gathered in the background while viewers are using other applications. Statistics can include but are not limited to: 1) the average number of viewers watching the broadcast; 2) the average number of times viewers watched the broadcast; 3) other shows the viewers watched; 4) the minimum and peak number of viewers; 5) what viewers most often switched to when they left a broadcast; 6) how long viewers watch a broadcast; 7) how many times viewers flip a channel; 8) which advertisements were watched by viewers; and 9) what viewers most often switched from when they entered a broadcast, etc. From these statistics, one or more popularity ratings can be determined.

The statistics used to generate popularity ratings can be generated using a counter for each broadcast channel being monitored. In some implementations, the counters can be intersected with demographic group data or geographic group data. The popularity ratings can be used by viewers to "see what's hot" while the broadcast is ongoing (e.g., by noticing an increased rating during the 2004 Super Bowl half-time performance). Advertisers and content providers can also use popularity ratings to dynamically adjust the material shown in response to ratings. This is especially true for advertisements, since the short unit length and numerous versions of advertisements generated by advertising campaigns are easily exchanged to adjust to viewer rating levels. Other examples of statistics include but are not limited to: popularity of a television broadcast versus a radio broadcast by demographics or time, the popularity of times of day, i.e., peak watching/ listening times, the number of households in a given area, the amount of channel surfing during particular shows (genre of shows, particular times of day), the volume of the broadcast, etc.

The personalized information is sent to the client-side interface (312). The popularity ratings can also be stored in a database for use by other processes (318), such as the dynamic adjustment of advertisements described above. The personalized information is received at the client-side interface (314) where it is formatted and presented in a user interface (316). The personalized information can be associated with a commenting medium (e.g., text messages in a chat room) that is presented to the user in a user interface. In some implementations, a chat room can include one or more subgroups. For example, a discussion group for "Seinfeld" might include a subgroup called "Seinfeld Experts," or a subgroup may be associated with a particular demographic, such as women between the ages of 20-30 who watch "Seinfeld," etc.

In some implementations, the raw information (e.g., counter values) used to generate statistics for popularity ratings is collected and stored at the client-side interface rather than at the social application server. The raw information can be transferred to the broadcaster whenever the user is online and/or invokes a mass personalization application.

In some implementations, a broadcast measurement box (BMB) is installed at the client-side interface. The BMB can be a simple hardware device that is similar to a set-top box but does not connect to the broadcast device. Unlike the Neilsen rating system, which requires hardware to be installed in the television, the BMB can be installed near the mass media system or within the range of the television signal. In some implementations, the BMB automatically records audio snippets and generates descriptors, which are stored in memory (e.g., flash media). In some implementations, the BMB can optionally include one or more hardware buttons which can be pressed by a user to indicate which broadcast they are watching (similar to Neilsen ratings). The BMB device can be picked-up by the ratings provider from time to time to collect the stored descriptors, or the BMB can broadcast the stored descriptors to one or more interested parties over a network connection (e.g., telephone, Internet, wireless radio, such as short message service (SMS) for radio, etc.) from time to time.

In some implementations, advertisements can be monitored to determine the ad's effectiveness, which can be reported back to advertisers. For example, which ads were watched, skipped, volume level of the ads, etc.

In some implementations, an image capture device (e.g., digital camera, video recorder, etc.) can be used to measure how many viewers are watching or listening to a broadcast. For example, various known pattern-matching algorithms can be applied to an image or a sequence of images to determine the number of viewers present in a broadcast environment during a particular broadcast. The images and or data derived from the images can be used in combination with audio descriptors to gather personalized information for a user, compute popularity ratings, or for any other purpose.

Audio Fingerprinting Process

Figure 4:
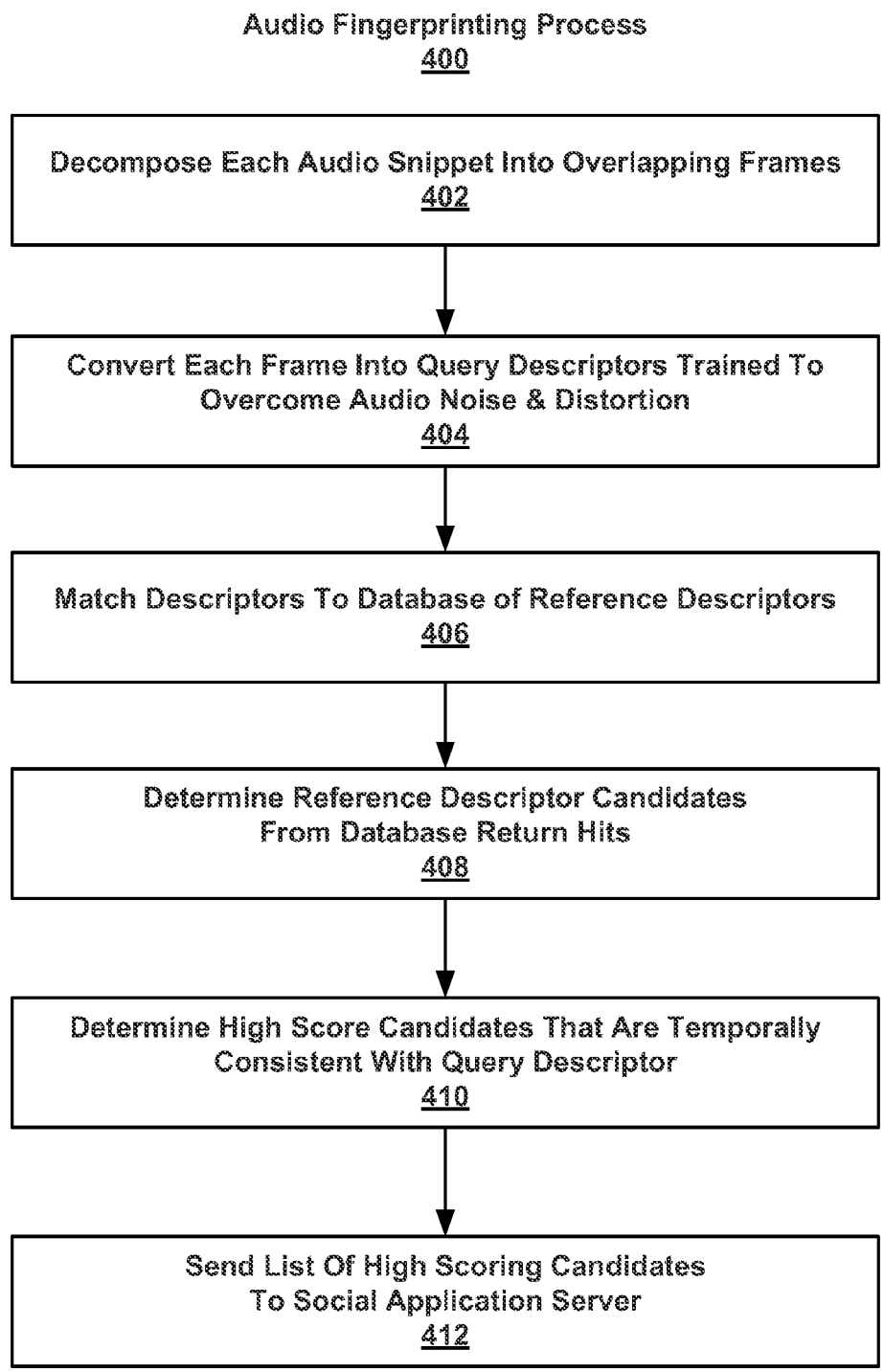
FIG. 4 is a flow diagram of one embodiment of an audio fingerprinting process.

FIG. 4 is a flow diagram of audio fingerprinting process 400. The steps of process 400 do not have to be completed in any particular order and at least some steps can be performed at the same time in a multi-threading or parallel processing environment. The process 400 matches query descriptors generated at a client-side interface (e.g., client-side interface 102) to reference descriptors stored in one or more databases in real-time and with low latency. The process 400 adapts a technique proposed by Ke et al. to handle ambient audio data (e.g., from a television broadcast) and queries.

The process 400 begins at a client-side interface by decomposing ambient audio snippets (e.g., 5-6 seconds of audio) of a mass media broadcast captured by an ambient audio detector (e.g., microphone) into overlapping frames (402). In some implementations, the frames are spaced apart by several milliseconds (e.g., 12 ms apart). Each frame is converted into a descriptor (e.g., a 32-bit descriptor) that is trained to overcome audio noise and distortion (404), as described in Ke et al. In some implementations, each descriptor represents an identifying statistical summary of the audio snippet.

In some implementations, the descriptors can be sent as query snippets (also referred to as query descriptors) to an audio database server where they are matched to a database of reference descriptors identifying statistical summaries of previously recorded audio snippets of the mass media broadcast (406). A list of candidate descriptors having best matches can be determined (408). The candidate descriptors can be scored, such that candidate descriptors that are temporally consistent with the query descriptor are scored higher than candidate descriptors that are less temporally consistent with the query descriptor (410). The candidate descriptors with the highest scores (e.g., score exceeds a sufficiently high threshold value) are transmitted or otherwise provided to a social application server (412) where they can be used to aggregate personalized information related to the media broadcast. Using a threshold ensures that the descriptors are sufficiently matched before the descriptors are transmitted or otherwise provided to the social application server (412).

In some implementations, the database of reference descriptors can be generated from broadcasts given by various media companies, which can be indexed and used to generate the descriptors. In other implementations, reference descriptors can also be generated using television guides or other metadata and/or information embedded in the broadcast signal.

In some implementations, speech recognition technology can be used to help identify which program is being watched. Such technology could help users discuss news events instead of just television shows. For example, a user could be watching a Shuttle launch on a different channel than another viewer and, therefore, possibly getting a different audio signal (e.g., due to a different newscaster). Speech recognition technology could be used to recognize keywords (e.g., Shuttle, launch, etc.), which can be used to link the user with a commenting medium.

Hashing Descriptors

Ke et al. uses computer vision techniques to find highly discriminative, compact statistics for audio. Their procedure trained on labeled pairs of positive examples (where x and x' are noisy versions of the same audio) and negative examples (where x and x' are from different audio). During this training phase, machine-learning technique based on boosting uses the labeled pairs to select a combination of 32 filters and thresholds that jointly create a highly discriminative statistic. The filters localize changes in the spectrogram magnitude, using first and second order differences across time and frequency. One benefit of using these simple difference filters is that they can be calculated efficiently using a integral image technique described in Viola, P. and Jones, M. (2002), Robust Real-Time Object Detection, *International Journal of Computer Vision*, which is incorporated by reference herein in its entirety.

In some implementations, the outputs of these 32 filters are thresholds, giving a single bit per filter at each audio frame. These 32 threshold results form only transmitted descriptors of that frame of audio. This sparsity in encoding ensures the privacy of the user to unauthorized eavesdropping. Further, these 32-bit descriptors are robust to the audio distortions in the training data, so that positive examples (e.g., matching frames) have small Hamming distances (i.e., distance measuring differing number of bits) and negative examples (e.g., mismatched frames) have large Hamming distances. It should be noted that more or fewer filters can be used and more than one bit per filter can be used at each audio frame (e.g., more bits using multiple threshold tests).

In some implementations, the 32-bit descriptor itself used as a hash key for direct hashing. The descriptor is a well-balanced hash function. Retrieval rates are further improved by querying not only the query descriptor, but also a small set of similar descriptors (up to a Hamming distance of 2 from the original query descriptor).

Within-Query Temporal Consistency

Once the query descriptors are matched to the audio database using the hashing procedure described above, the matches are validated to determine which of the database return hits are accurate matches. Otherwise, a candidate descriptor might have many frames matched to the query descriptor but with the wrong temporal structure.

In some implementations, validation is achieved by viewing each database hit as support for a match at a specific query-database offset. For example, if the eight descriptor ($q_8$) in a 5-second, 415-frame-long "Seinfeld" query snippet, q, hits the $1008^{th}$ database descriptor ($x_{1008}$), this supports a candidate match between the 5-second query and frames 1001 through 1415 in the audio database. Other matches between $q_n$ and $x_{1000+n}$ ($1 \le n \le 415$) would support this same candidate match.

In addition to temporal consistency, we need to account for frames when conversations temporarily drown out the ambient audio. This can be modeled as an exclusive switch between ambient audio and interfering sounds. For each query frame i, there is a hidden variable, $y_i$: if $y_i=0$, the $i^{th}$ frame of the query is modeled as interference only; if $y_i=1$, the $i^{th}$ frame is modeled as from clean ambient audio. Taking an extreme view (pure ambient or pure interference) is justified by the extremely low precision with which each audio frame is represented (32 bits) and softened by providing additional bit-flop probabilities for each of the 32 positions of the frame vector under each of the two hypotheses ($y_i=0$ and $y_i=1$). Finally, we model the between-frame transitions between ambient-only and interference-only states as a hidden first-order Markov process, with transition probabilities derived from training data. For example, we can re-use the 66-parameter probability model given by Ke et al., CVPR 2005.

The final model of the match probability between a query vector, q, and an ambient-database vector at an offset of N frames, $x_N$, is:

$$P(q|x^N) = \prod_{n=1}^{415} P(\langle q_n, x_{N+n} \rangle | y_n) P(y_n | y_{n-1}) \quad (1)$$

where $\langle q_n, x_m \rangle$ denotes the bit differences between the 32-bit frame vectors $q_n$ and $x_m$. This model incorporates both the temporal consistency constraint and the ambient/interference hidden Markov model.

Post-Match Consistency Filtering

People often talk with others while watching television, resulting in sporadic but strong acoustic interference, especially when using laptop-based microphones for sampling the ambient audio. Given that most conversational utterances are two or three seconds in duration, a simple communication exchange between viewers could render a 5-second query unrecognizable.

In some implementations, post-match filtering is used to handle these intermittent low-confidence mismatches. For example, we can use a continuous-time hidden Markov model of channel switching with an expected dwell time (i.e., time between channel changes) of L seconds. The social application server 106 indicates the highest-confidence match within the recent past (along with its "discounted" confidence) as part of state information associated with each client session. Using this information, the server 106 selects either the content-index match from the recent past or the current index match, base on whichever has the higher confidence.

We use $M_h$ and $C_h$ to refer to the best match for the previous time step (5 seconds ago) and its log-likelihood confidence score. If we simply apply the Markov model to this previous best match, without taking another observation, then our expectation is that the best match for the current time is that same program sequence, just 5 seconds further along, and our confidence in this expectation is $C_h - l/L$, where $l=5$ seconds is the query time step. This discount of $l/L$ in the log-likelihood corresponds to the Markov model probability, $e^{-l/L}$, of not switching channels during the l-length time step.

An alternative hypothesis is generated by the audio match for the current query. We use Mo to refer to the best match for the current audio snippet: that is, the match that is generated by the audio fingerprinting process 400. Co is the log-likelihood confidence score given by the audio fingerprinting process 400.

If these two matches (the updated historical expectation and the current snippet observation) give different matches, we select the hypothesis with the higher confidence score:

$$\{M_0, C_0\} = \begin{cases} \{M_h, C_h - l/L\} & \text{if } C_h - l/L > C_0 \\ \{M_0, C_0\} & \text{otherwise} \end{cases} \quad (2)$$

, where $M_0$ is the match that is used by the social application server 106 for selecting related content and $M_0$ and $C_0$ are carried forward on the next time step as $M_h$ and $C_h$.

User Interface

Figure 5:
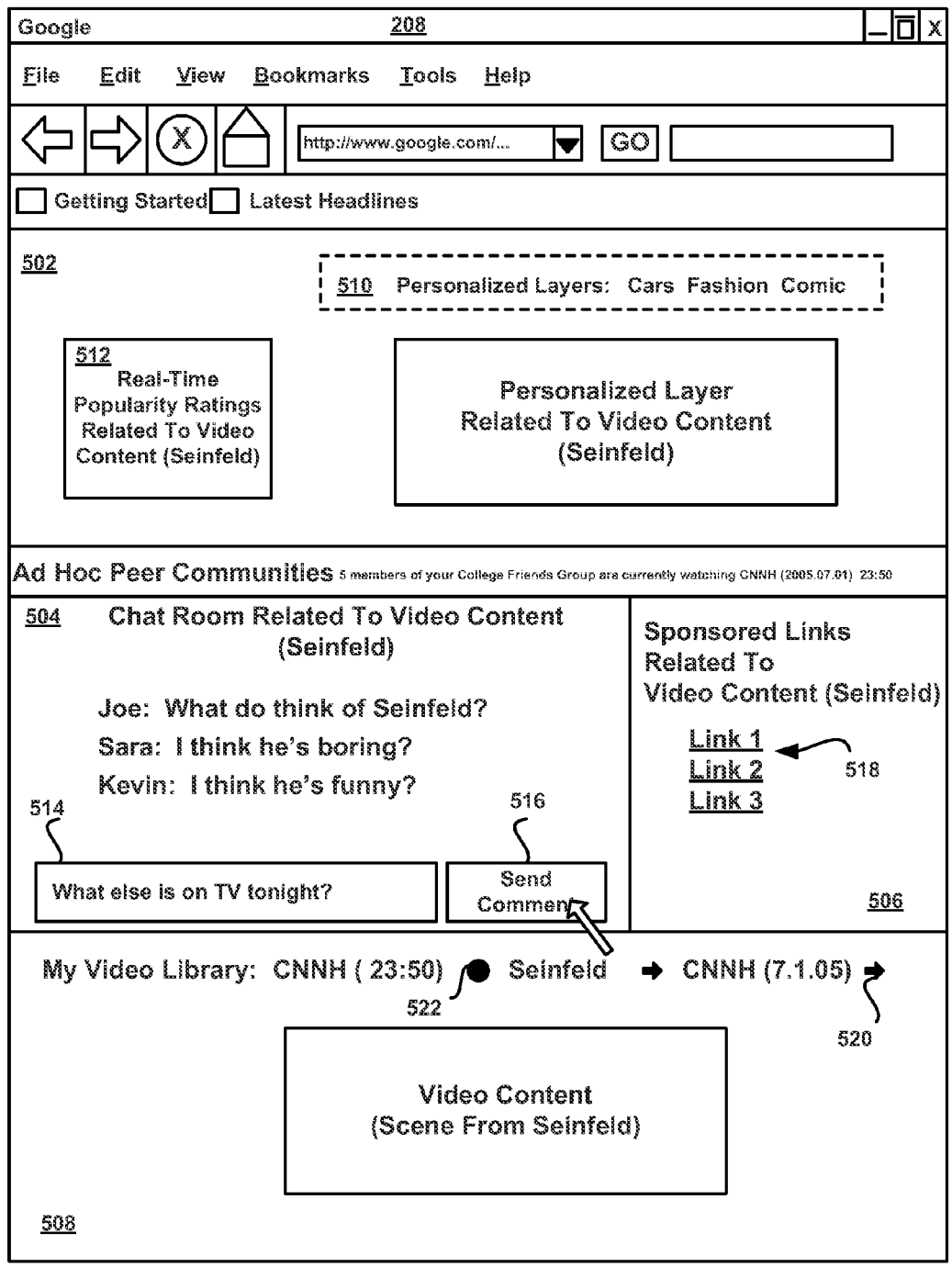
FIG. 5 is a flow diagram of one embodiment of a user interface for interacting with mass personalization applications.

FIG. 5 is a flow diagram of one embodiment of a user interface 208 for interacting with mass personalization applications. The user interface 208 includes a personalized layer display area 502, a commenting medium display area 504, a sponsored links display area 506 and a content display area 508. The personalized layer display area 502 provides complementary information and/or images related to the video content shown in the content display area 508. The personalized layers can be navigated using a navigation bar 510 and an input device (e.g., a mouse or remote control). Each layer has an associated label in the navigation bar 510. For example, if the user selects the "Fashion" label, then the fashion layer, which includes fashion related content associated with "Seinfeld," will be presented in the display area 502.

In some implementations, the client-side interface 102 includes a display device 210 capable of presenting the user interface 208. In some implementations, the user interface 208 is an interactive web page served by the social application server 106 and presented in a browser window on the screen of the display device 210. In some implementations, the user interface 208 is persistent and will be available for interaction after the broadcast audio used in the content match process has shifted in time. In some implementations, the user interface 208 is dynamically updated over time or in response to a trigger event (e.g., a new person enters the chat room, a commercial begins, etc.). For example, each time a commercial is broadcast, the sponsored links display area 506 can be updated with fresh links 518 related to the subject matter of the commercial.

In some implementations, the personalized information and sponsored links can be emailed to the viewer or shown on a side bar at a later time.

In some implementations, the client-side interface 102 receives personalized information from the social application server 106. This information can include a web page, email, a message board, links, instant message, a chat room, or an invitation to join an ongoing discussion group, eRoom, video conference or netmeeting, voice call (e.g., Skype®), etc. In some implementations, the user interface 208 provides access to comments and/or links to comments from previously seen broadcasts or movies. For example, if user is currently watching a DVD of "Shrek" he may want to see what people said about the movie in the past.

In some implementations, the display area 502 includes a rating region 512, which is used to display popularity ratings related to a broadcast. For example, the display area 512 may show how many viewers are currently watching "Seinfeld" compared to another television show that is broadcast at the same time.

In some implementations, the commenting medium display area 504 presents a chat room type environment where multiple users can comment about broadcasts. In some implementations, the display area 504 includes a text box 514 for inputting comments that are sent to the chat room using the input mechanism 516 (e.g., a button).

The sponsored links display area 506 includes information, images and/or links related to advertising that is associated with the broadcast. For example, one of the links 518 may take the user to a web site that is selling "Seinfeld" merchandise.

The content display area 508 is where the broadcast content is displayed. For example, a scene from the current broadcast can be displayed with other relevant information (e.g., episode number, title, timestamp, etc.). In some implementations, the display area 508 includes controls 520 (e.g., scroll buttons) for navigating through the displayed content.

Video Bookmarks

In some implementations, a button 522 is included in the content display area that can be used to bookmark video. For example, by clicking the button 522, the "Seinfeld" episode shown in the display area 508 is added to the user's favorites video library, which can then be viewed on-demand through a web-based streaming application or other access methods. According to the policy set by the content owner, this streaming service can provide free single-viewing playback, collect payments as the agent for the content owners, or insert advertisements that would provide payment to the content owners.

Client-Side Interface Hardware Architecture

Figure 6:
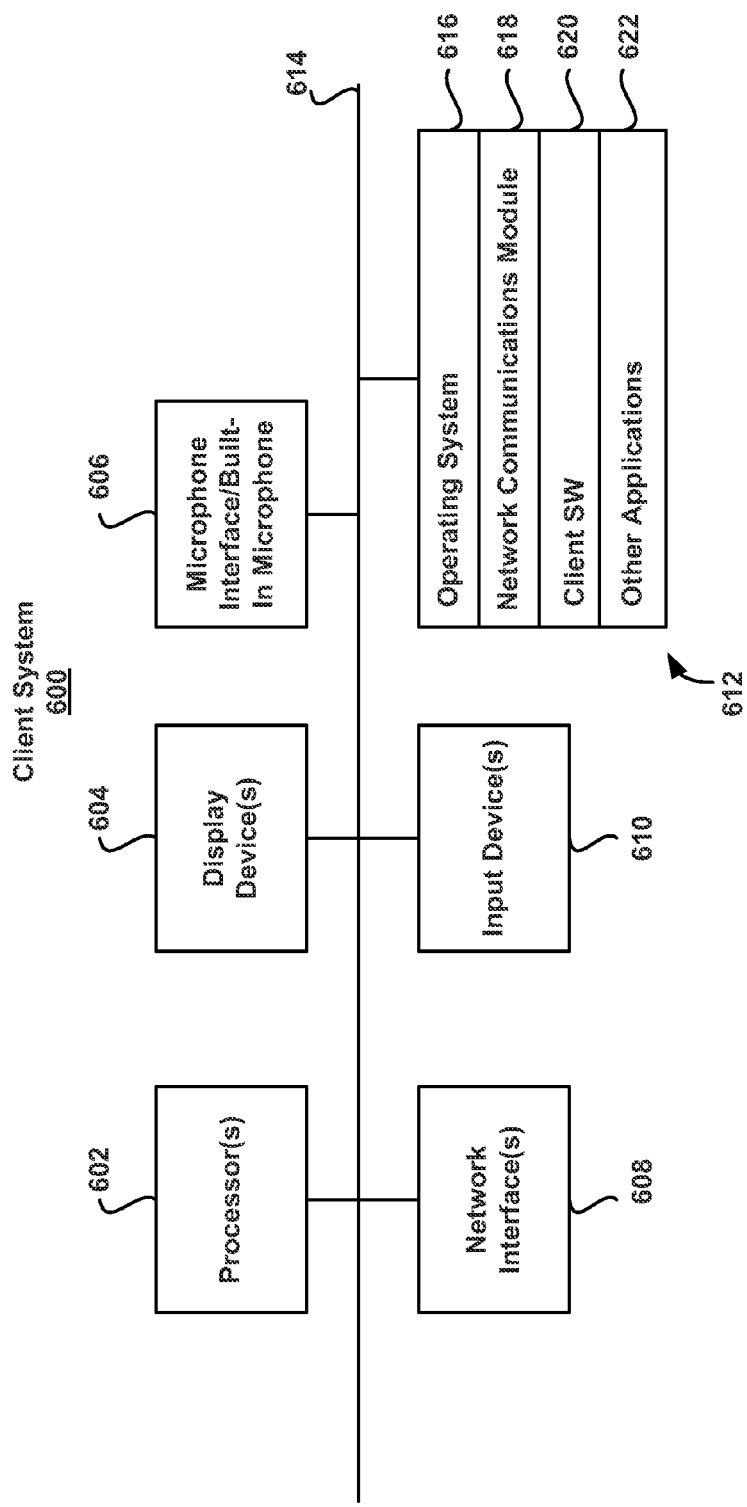
FIG. 6 is a block diagram of one embodiment of hardware architecture for a client system for implementing the client-side interface shown in FIG. 1.

FIG. 6 is block diagram of hardware architecture 600 for the client-side interface 102 shown in FIG. 1. Although the hardware architecture 600 is typical of a computing device (e.g., a personal computer), the disclosed implementations can be realized in any device capable of presenting a user interface on a display device, including but not limited to: desktop or portable computers; electronic devices; telephones; mobile phones; display systems; televisions; monitors; navigation systems; portable media players/recorders; personal digital assistants; game systems; handheld electronic devices; and embedded electronic devices or appliances.

In some implementations, the system 600 includes one or more processors 602 (e.g., CPU), optionally one or more display devices 604 (e.g., CRT, LCD, etc.), a microphone interface 606, one or more network interfaces 608 (e.g., USB, Ethernet, FireWire® ports, etc.), optionally one or more input devices 610 (e.g., mouse, keyboard, etc.) and one or more computer-readable mediums 612. Each of these components is operatively coupled to one or more buses 614 (e.g., EISA, PCI, USB, FireWire®, NuBus, PDS, etc.).

In some implementations, there are no display devices or input devices and the system 600 just performs sampling and encoding (e.g., generating descriptors, etc.) in the background without user input.

The term "computer-readable medium" refers to any medium that participates in providing instructions to a processor 602 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium(s) 612 further includes an operating system 616 (e.g., Mac OS®, Windows®, Unix, Linux, etc.), a network communications module 618, client software 620 and one or more applications 622. The operating system 616 can be multi-user, multiprocessing, multitasking, multithreading, real-time and the like. The operating system 616 performs basic tasks, including but not limited to: recognizing input from input devices 610; sending output to display devices 604; keeping track of files and directories on storage devices 612; controlling peripheral devices (e.g., disk drives, printers, image capture device, etc.); and managing traffic on the one or more buses 614.

The network communications module 618 includes various components for establishing and maintaining network connections (e.g., software for implementing communication protocols, such as TCP/IP, HTTP, Ethernet, USB, FireWire®, etc.).

The client software 620 provides various software components for implementing the client-side of the mass personalization applications and for performing the various client-side functions described with respect to FIGS. 1-5 (e.g., ambient audio identification). In some implementations, some or all of the processes performed by the client software 620 can be integrated into the operating system 616. In some implementations, the processes can be at least partially implemented in digital electronic circuitry, or in computer hardware, firmware, software, or in any combination thereof.

Other applications 624 can include any other software application, including but not limited to: word processors, browsers, email, Instant Messaging, media players, telephony software, etc.

Detecting Advertisements and Rebroadcasts

Repetition Detection

When preparing a database for search, it helps to be able to pre-flag repeated material using the descriptors previously described. Repeating material can include but is not limited to repeating shows, advertisements, sub-segments (e.g., stock footage in news shows), etc. Using these flags, repeated material can be presented in a way that does not push all other material beyond the attention span of a user conducting a search (e.g., beyond the first 10-20 hits). The process 700 described below provides a way to detect those duplicates prior to any search queries on the database.

Video Ad Removal

One of the complaints that broadcasters have had about allowing material to be searched and played back is the rebroadcast of embedded advertising. From the point of view of the broadcasters, this rebroadcast is counterproductive: it lowers the value of the broadcasts that the advertiser pays for directly, since it provides that advertiser with free advertising. Unless old advertisements are removed and new advertisements are put in place in a way that returns some review to the original broadcasters, they do not profit from the replay of their previously broadcast material. The process 700 described below provides a way of detecting embedded advertisement by looking for repetitions, possibly in conjunction with other criteria (e.g., duration, volume, visual activity, bracketing blank frames, etc.).

Video Summarization

If a "summary" (i.e., shorter version) of non-repeated program material is needed, one way to get that is to remove the advertisements (as detected by repeated material) and to take segments from the material just preceding and just following the advertisement location. On broadcast television, these positions in the program typically contain "teasers" (before the ads) and "recaps" (just after the ads). If a summary is to be made of a news program that includes a mix of non-repeated and repeated non-advertisement material, typically the repeated non-advertisement material corresponds to a sound bite. These segments generally contribute less information than the anchorperson's narration of the news story and are good candidates for removal. If a summary is to be made of a narrative program (e.g. a movie or a serial installment), repeated audio tracks typically correspond to theme sounds, mood music, or silence. Again, these are typically good segments to remove from a summary video. The process 700 described below provides a way of detecting these repeated audio tracks so they can be removed from the summary video.

Repetition Detection Process

Figure 7:
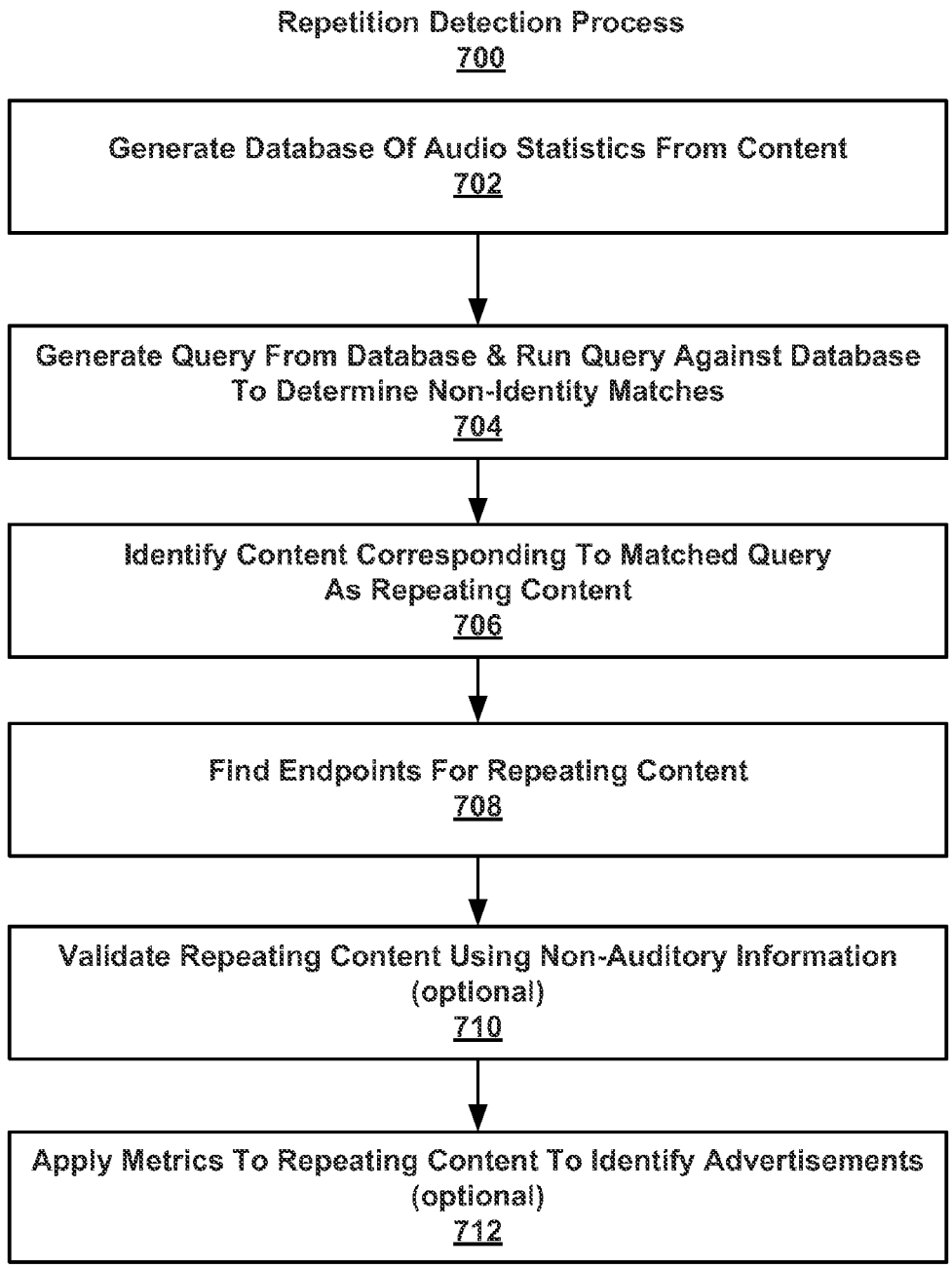
FIG. 7 is a flow diagram of one embodiment of a repetition detection process.

FIG. 7 is a flow diagram of one embodiment of a repetition detection process 700 in accordance. The steps of process 700 do not have to be completed in any particular order and at least some steps can be performed at the same time in a multi-threading or parallel processing environment.

The process 700 begins by creating a database of audio statistics from a set of content such as television feeds, video uploads, etc. (702). For example, the database could contain 32-bit/frame descriptors, as described in Ke et al. Queries are taken from the database and run against the database to see where repetitions occur (704). In some implementations, a short segment of audio statistics is taken as a query and run checked for non-identity matches (matches that are not identical) using hashing techniques (e.g. direct hashing or locality sensitive hashing (LSH)) to achieve a short list of possible auditory matches. These candidate matches are then processed in a validation procedure, for example, as described in Ke, et al. Content corresponding to a validated candidate match can be identified as repeating content (706).

The non-identity matches that are strongest are "grown" forwards and backwards in time, to find the beginning and ending points of the repeated material (708). In some implementations, this can be done using known dynamic programming techniques (e.g., Viterbi decoding). In extending the match forward in time, the last time slice in the strong "seed" match is set as "matching" and the last time slice of the first below-believable-strength match for the same database offset between the query and the match is set as "not matching." In some implementations, match scores for individual frames in between these two fixed points are used as observations, and a first-order Markov model allowing within state transitions, plus a single transition from "matching" to "not-matching" states, is used. The transition probability from matching to not matching to 1/L can be set somewhat arbitrarily, where L is the number of frames between these two fixed points, corresponding to the least knowledge of the transition location within the allowed range. Another possibility for selecting transition probabilities would use the match strength profiles to bias this estimate to an earlier or later transition. But this would increase the complexity of the dynamic programming model and is not likely to improve the results, since the match strengths are already used as observations within this period. The same process is used to grow the segment matches backwards in time (e.g., just switch past/future and run the same algorithm).

In some implementations the audio cues are combined with non-auditory information (e.g., visual cues) to obtain higher matching accuracies. For example, the matches that are found with audio matching can then be verified (or checked a second time) by using simple visual similarity metrics (710). These metrics can include but are not limited to: color histograms (e.g., frequencies of similar colors in two images), statistics on number and distribution of edges, etc. These need not be computed only over the entire image, but can be computed for sub-regions of the images as well, and compared to the corresponding sub-regions in the target image.

For those applications that are looking for advertisements (in contrast with all types of repeated material), the results of repeated-material detection can be combined with metrics aimed at distinguishing advertisements from non-advertisements (712). These distinguishing characteristics can rely on advertising conventions, such as durations (e.g., 10/15/30-second spots are common), on volume (e.g., advertisements tend to be louder than surrounding program material, so if the repeated material is louder than the material on either side, it is more likely to be an advertisement), on visual activity (e.g., advertisements tend to have more rapid transitions between shots and more within-shot motion, so if the repeated material has larger frame differences than the material on either side, it is more likely to be an advertisement), and on bracketing blank frames (locally inserted advertisements typically do not completely fill the slot that is left for it by the national feed, resulting in black frames and silence at a spacing that is a multiple of 30 seconds).

Once advertisements are identified, material surrounding the advertisements can be analyzed and statistics can be generated. For example, statistics can be generated about how many times a particular product is advertised using a particular creative (e.g., images, text), or how many times a particular segment is aired, etc. In some implementations, one or more old advertisements can be removed or replaced with new advertisements. Additional techniques for advertisement detection and replacement are described in Covell, M., Baluja, S., Fink, M., Advertisement Detection and Replacement Using Acoustic and Visual Repetition, IEEE Signal Processing Society, MMSP 2006 International Workshop on Multimedia Signal Processing, Oct. 3-6, 2006, BC Canada, which article is incorporated by reference herein in its entirety.

In some implementations, information from content owners about the detailed structure of the content (e.g., where ad material was inserted, where programs were repeated) could be used to augment the process 700 and increase matching accuracies. In some implementations, video statistics can be used to determine repetition instead of audio. In other implementations, a combination of video and audio statistics can be used.

Audio Snippet Auctions

In some implementations, advertisers can participate in auctions related to the presence of ambient audio that is related to the product or service that the advertiser want to sell. For example, multiple advertisers could bid in an auction for the right to associate its products or services with an audio snippet or descriptor associated with "Seinfeld." The winner of the auction could then put some related information in front of the viewer (e.g., the sponsored links) whenever the subject ambient audio is present. In some implementations, advertisers could bid on ambient audio snippets having a meta-level description. For example, advertisers could bid on audio that is associated with a television ad (e.g., this is the audio associated with a Ford Explorer TV ad), on closed captioning (e.g., the captioning says "Yankees baseball"), on program segment location (e.g., this audio will occur 15 min into the "Seinfeld" and will occur 3 minutes after the previous commercial break and 1 min before the next commercial break), or on low-level acoustic or visual properties (e.g., "background music," "conversational voices," "explosive-like", etc.)

In some implementations, one or more mass personalization applications can be run in the background while the user performs other tasks such as browsing another web site (e.g., a sponsored link). Material that is related to a media broadcast (e.g., television content) can participate in the same sponsored link auctions as material that is related to another content source (e.g., web site content). For example, TV related ads can be mixed with ads that correspond to the content of a current web page.

Various modifications may be made to the disclosed implementations and still be within the scope of the following claims.

What is claimed is:

1. A method, comprising:
   determining, by a system including a processor, a first match $M_h$ between a first audio descriptor representing a first recording at a first time step in an environment and a first reference descriptor, the first match $M_h$ having-a first confidence score $C_h$ indicative of a confidence of the first match, the first time step having a time step length l;
   determining, by the system, a second match $M_0$ between a second audio descriptor representing a second recording at a second time step in the environment and a second reference descriptor, the second match $M_0$ having a second confidence score $C_0$ indicative of a confidence of the second match, the second time step having the time step length l, wherein the first time step is prior to the second time step, and the first match $M_h$ and the second match $M_0$ are non-identity matches determined using a direct or locality sensitive hashing function and a validation process to select a most accurate match out of a plurality of candidate matches, wherein the first confidence score $C_h$ and the second confidence score $C_0$ are based upon a log-likelihood function given by an audio fingerprinting process;
   discounting, by the system, the first confidence score $C_h$ by a discount value l/L to generate a discounted first confidence score $C_h$–l/L, where L is an expected dwell time between a channel change;
   in response to the discounted first confidence score $C_h$–l/L being greater than the second confidence score $C_0$, employing, by the system, the first reference descriptor associated with the first match $M_h$ for selecting related content; and
   in response to the discounted first confidence score $C_h$–l/L not being greater than the second confidence score $C_0$, employing, by the system, the second reference descriptor associated with the second match $M_0$ for selecting the related content.

2. The method of claim 1, further comprising:
   in response to the discounted first confidence score $C_h$–l/L being greater than the second confidence score $C_0$, designating, by the system, the first reference descriptor as a best match to the second audio descriptor of the second time step.

3. The method of claim 1, further comprising:
   in response to the discounted first confidence score $C_h$–l/L not being greater than the second confidence score $C_0$, designating, by the system, the second reference descriptor as a best match to the second audio descriptor of the second time step.

4. The method of claim 1, wherein the second reference descriptor has a highest confidence score of a plurality of reference descriptors that match the second audio descriptor.

5. The method of claim 1, wherein the first reference descriptor has a highest confidence score of a plurality of reference descriptors that match the first audio descriptor.

6. A non-transitory computer-readable medium having instructions stored thereon that, in response to execution, cause a system including a processor to perform operations comprising:
   determining a first match $M_h$ between a first audio descriptor representing a first recording at a first time step in an environment and a first reference descriptor, the first match $M_h$ having-a first confidence score $C_h$ indicative of a confidence of the first match, the first time step having a time step length l;
   determining a second match $M_0$ between a second audio descriptor representing a second recording at a second time step in the environment and a second reference descriptor, the second match $M_0$ having a second confidence score $C_0$ indicative of a confidence of the second match, the second time step having the time step length l, wherein the first time step is temporally prior to the second time step, and the first match $M_h$ and the second match $M_0$ are non-identity matches determined using a direct or locality sensitive hashing function and a validation process to select a most accurate match out of a plurality of candidate matches, wherein the first confidence score $C_h$ and the second confidence score $C_0$ are based upon a log-likelihood function given by an audio fingerprinting process;
   discounting the first confidence score $C_h$ by a discount value l/L to generate a discounted first confidence score $C_h$–l/L, where L is an expected dwell time between a channel change;

in response to the discounted first confidence score $C_h-1/L$ being greater than the second confidence score $C_0$, employing the first reference descriptor associated with the first match $M_h$ for selecting related content; and in response to the discounted first confidence score $C_h-1/L$ not being greater than the second confidence score $C_0$, employing the second reference descriptor associated with the second match $M_0$ for selecting the related content.

7. The non-transitory computer-readable medium of claim 6, the operations further comprising:

in response to the discounted first confidence score $C_h-1/L$ being greater than the second confidence score $C_0$, designating the first reference descriptor as a best match to the second audio descriptor of the second time step.

8. The non-transitory computer-readable medium of claim 6, the operations further comprising:

in response to the discounted first confidence score $C_h-1/L$ not being greater than the second confidence score $C_0$, designating the second reference descriptor as a best match of the second time step.

9. The non-transitory computer-readable medium of claim 6, wherein the second reference descriptor has a highest confidence score of a plurality of reference descriptors that match the second audio descriptor.

10. The non-transitory computer-readable medium of claim 6, wherein the first reference descriptor has a highest confidence score of a plurality of reference descriptors that match the first audio descriptor.

11. A system, comprising:

a processor, communicatively coupled to a memory that stores computer-executable instructions, that executes or facilitates execution of the computer-executable instructions to perform operations comprising:

a social application server:

determine a first match $M_h$ between a first audio descriptor representing a first recording at a first time step in an environment and a first reference descriptor, the first match $M_h$ having a first confidence score $C_h$ indicative of a confidence of the first match, the first time step having a time step length l;

determine a second match $M_0$ between a second audio descriptor representing a second recording at a second time step in the environment and a second reference descriptor, the second match $M_0$ having a second confidence score $C_0$ indicative of a confidence of the second match, the second time step having the time step length l, wherein the first time step is temporally prior to the second time step, and the first match $M_h$ and the second match $M_0$ are non-identity matches determined using a direct or locality sensitive hashing function and a validation process to select a most accurate match out of a plurality of candidate matches, wherein the first confidence score $C_h$ and the second confidence score $C_0$ are based upon a log-likelihood function given by an audio fingerprinting process;

discount the first confidence score $C_h$ by a discount value $1/L$ to generate a discounted first confidence score $C_h-1/L$, where L is an expected dwell time between a channel change;

in response to the discounted first confidence score $C_h-1/L$ being greater than the second confidence score $C_0$, employ the first reference descriptor associated with the first match $M_h$ for selecting related content; and in response to the discounted first confidence score $C_h-1/L$ not being greater than the second confidence score $C_0$, employ the second reference descriptor associated with the second match $M_0$ for selecting the related content.

12. The system of claim 11, wherein the social application server further determine:

in response to the discounted first confidence score $C_h-1/L$ being greater than the second confidence score $C_0$, designate the first reference descriptor as a best match to the second audio descriptor of the second time step.

13. The system of claim 11, wherein the social application server further determine:

in response to the discounted first confidence score $C_h-1/L$ not being greater than the second confidence score $C_0$, designate the second reference descriptor as a best match to the second audio descriptor of the second time step.

14. The system of claim 11, wherein the second reference descriptor has a highest confidence score of a plurality of reference descriptors that match the second audio descriptor.

15. The system of claim 11, wherein the first reference descriptor has a highest confidence score of a plurality of reference descriptors that match the first audio descriptor.

* * * * *